United States Patent
Pilutti et al.

(10) Patent No.: US 10,358,130 B2
(45) Date of Patent: Jul. 23, 2019

(54) SYSTEM AND METHODS FOR ADAPTIVE CRUISE CONTROL BASED ON USER DEFINED PARAMETERS

(71) Applicant: Ford Global Technologies, LLC, Dearborn, MI (US)

(72) Inventors: Thomas Edward Pilutti, Ann Arbor, MI (US); Shane Elwart, Ypsilanti, MI (US); Johannes Geir Kristinsson, Ann Arbor, MI (US); David Hamilton, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/722,969

(22) Filed: Oct. 2, 2017

(65) Prior Publication Data

US 2018/0043891 A1    Feb. 15, 2018

Related U.S. Application Data

(63) Continuation of application No. 15/083,779, filed on Mar. 29, 2016, now Pat. No. 9,827,986.

(51) Int. Cl.
*B60K 35/00* (2006.01)
*B60W 30/14* (2006.01)
(Continued)

(52) U.S. Cl.
CPC ........... *B60W 30/143* (2013.01); *B60K 35/00* (2013.01); *B60W 30/16* (2013.01); *G01S 19/13* (2013.01);
(Continued)

(58) Field of Classification Search
CPC .. B60W 30/143; B60W 30/16; B60W 30/162; G01S 19/13; B60K 35/00;
(Continued)

(56) References Cited

U.S. PATENT DOCUMENTS 6,116,369 A    9/2000   King
6,161,072 A   12/2000   Clapper et al.
(Continued)

FOREIGN PATENT DOCUMENTS

DE    10335731 A1    2/2005
EP     2886410 A1    6/2015
(Continued)

OTHER PUBLICATIONS

Search Report dated Aug. 15, 2017 for GB Patent Application No. GB1704330.8US (3 Pages).

*Primary Examiner* — Michael J Zanelli
(74) *Attorney, Agent, or Firm* — Frank Lollo; Neal, Gerber & Eisenberg LLP; James P. Muraff

(57) ABSTRACT

Systems and methods for adaptive cruise control based on user defined parameters are disclosed. An example disclosed vehicle includes a GPS receiver configured to provide a location of the vehicle, an adaptive cruise control; and a cruise control adjuster. In the example cruise control adjuster is configured to generate an action when a cruise control event is defined for the location. In the disclosed example the cruise control event is based on past changes to the adaptive cruise control at the location. The example cruise control adjuster is also configured to apply the action to the adaptive cruise control to change how the adaptive cruise control controls the vehicle.

15 Claims, 7 Drawing Sheets

| | Date | Location | Action | Gap Distance | Speed | Expiration |
|---|---|---|---|---|---|---|
| 202 | 8/4/2015 | FWY 39 MM 5 | Activate | 2 | 66 | 8/4/2015 |
| 202 | 8/4/2015 | FWY 39 MM 7 | Gap+ | 3 | - | 8/4/2015 |
| 202 | 8/4/2015 | FWY 39 MM 9 | Deactivate | - | - | 8/4/2015 |
| 202 | 8/4/2015 | FWY 39 MM 11 | Resume | 3 | 66 | 8/4/2015 |
| 202 | 8/5/2015 | FWY 39 MM 5 | Activate | 2 | 61 | 8/5/2015 |
| 202 | 8/5/2015 | FWY 39 MM 9 | Deactivate | - | - | 8/5/2015 |
| 202 | 8/5/2015 | FWY 39 MM 12 | Resume | 2 | 61 | 8/5/2015 |
| 202 | 8/5/2015 | FWY 39 MM 14 | Speed+ | 2 | 65 | 8/5/2015 |
| 202 | 8/7/2015 | FWY 39 MM 14 | Activate | 3 | 63 | 8/7/2015 |
| 202 | 8/8/2015 | FWY 39 MM 5 | Activate | 3 | 55 | 8/8/2015 |
| 202 | 8/8/2015 | FWY 39 MM 9 | Deactivate | - | - | 8/8/2015 |

(51) Int. Cl.
*B60W 30/16* (2012.01)
*G01S 19/13* (2010.01)

(52) U.S. Cl.
CPC *B60K 2310/244* (2013.01); *B60K 2350/1092* (2013.01); *Y02T 10/84* (2013.01)

(58) Field of Classification Search
CPC .......... B60K 2310/24; B60K 2310/262; G05D 1/0223; B60T 2201/02
See application file for complete search history.

(56) References Cited

U.S. PATENT DOCUMENTS

| | | |
|---|---|---|
| 6,188,949 B1 | 2/2001 | Hahn et al. |
| 6,836,719 B2 | 12/2004 | Andersson |
| 6,895,324 B2 | 5/2005 | Straub |
| 2013/0226400 A1 | 8/2013 | King |
| 2014/0005908 A1 | 1/2014 | Kolberg |
| 2014/0025275 A1 | 1/2014 | Kindel |
| 2015/0191169 A1 | 7/2015 | Fairgrieve et al. |
| 2017/0144659 A1 | 5/2017 | Thomas |

FOREIGN PATENT DOCUMENTS

| | | |
|---|---|---|
| KR | 20120119424 A | 10/2012 |
| WO | WO 2010088869 A | 8/2010 |

| Date 204 | Location 206 | Action 208 | Gap Distance 210 | Speed 210 | Expiration 212 |
|---|---|---|---|---|---|
| 8/4/2015 | FWY 39 MM 5 | Activate | 2 | 66 | 8/4/2015 |
| 8/4/2015 | FWY 39 MM 7 | Gap+ | 3 | - | 8/4/2015 |
| 8/4/2015 | FWY 39 MM 9 | Deactivate | - | - | 8/4/2015 |
| 8/4/2015 | FWY 39 MM 11 | Resume | 3 | 66 | 8/4/2015 |
| 8/5/2015 | FWY 39 MM 5 | Activate | 2 | 61 | 8/5/2015 |
| 8/5/2015 | FWY 39 MM 9 | Deactivate | - | - | 8/5/2015 |
| 8/5/2015 | FWY 39 MM 12 | Resume | 2 | 61 | 8/5/2015 |
| 8/5/2015 | FWY 39 MM 14 | Speed+ | 2 | 65 | 8/5/2015 |
| 8/7/2015 | FWY 39 MM 14 | Activate | 3 | 63 | 8/7/2015 |
| 8/8/2015 | FWY 39 MM 5 | Activate | 3 | 55 | 8/8/2015 |
| 8/8/2015 | FWY 39 MM 9 | Deactivate | - | - | 8/8/2015 |

ACC State Database 200

FIG. 2

SYSTEM AND METHODS FOR ADAPTIVE CRUISE CONTROL BASED ON USER DEFINED PARAMETERS

CROSS-REFERENCE TO RELATED APPLICATION

This application is a continuation of U.S. patent application Ser. No. 15/083,779, filed on Mar. 29, 2016. The prior application is hereby incorporated by reference in its entirety.

TECHNICAL FIELD

The present disclosure generally relates to adaptive cruise control and, more specifically, systems and methods for adaptive cruise control based on user defined parameters.

BACKGROUND

More and more, vehicles include adaptive cruise control to maintain a desired speed manually set by a driver. The adaptive cruise control uses RADAR or other range detection sensors to detect a slower vehicle ahead and reduces the speed of the vehicle so that the vehicle maintains a safe following distance behind the slower vehicle. Currently, the adaptive cruise control is manually adjusted by the driver when traffic density, the speed limit, the weather or road conditions change.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments of systems and methods for adaptive cruise control based on user defined parameters are disclosed. An example disclosed vehicle includes a GPS receiver configured to provide a location of the vehicle, an adaptive cruise control, and a cruise control adjuster. In the example cruise control adjuster is configured to generate an action when a cruise control event is defined for the location. In the disclosed example the cruise control event is based on past changes to the adaptive cruise control at the location. The example cruise control adjuster is also configured to apply the action to the adaptive cruise control to change how the adaptive cruise control controls the vehicle.

An example method of controlling a vehicle involves monitoring, by a GPS receiver, a location of the vehicle. The example method also involves generating, by a processor, an action when a cruise control event is defined for the location, the cruise control event based on past changes to an adaptive cruise control at the location. The example method also involves applying the action to the adaptive cruise control to change how the adaptive cruise control controls the vehicle.

An example tangible computer readable medium comprises instructions that, when executed, cause a vehicle to monitor, with a GPS receiver, a location of the vehicle. The example instructions also cause the vehicle to generate an action when a cruise control event is defined for the location. The example cruise control event is based on past changes to an adaptive cruise control at the location. Additionally, the example instructions also cause the vehicle to apply the action to the adaptive cruise control to change how the adaptive cruise control controls the vehicle.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 2 illustrates an example data structure to events associated with the adaptive cruise control of FIG. 1.

DETAILED DESCRIPTION OF EXAMPLE EMBODIMENTS

Figure 1:
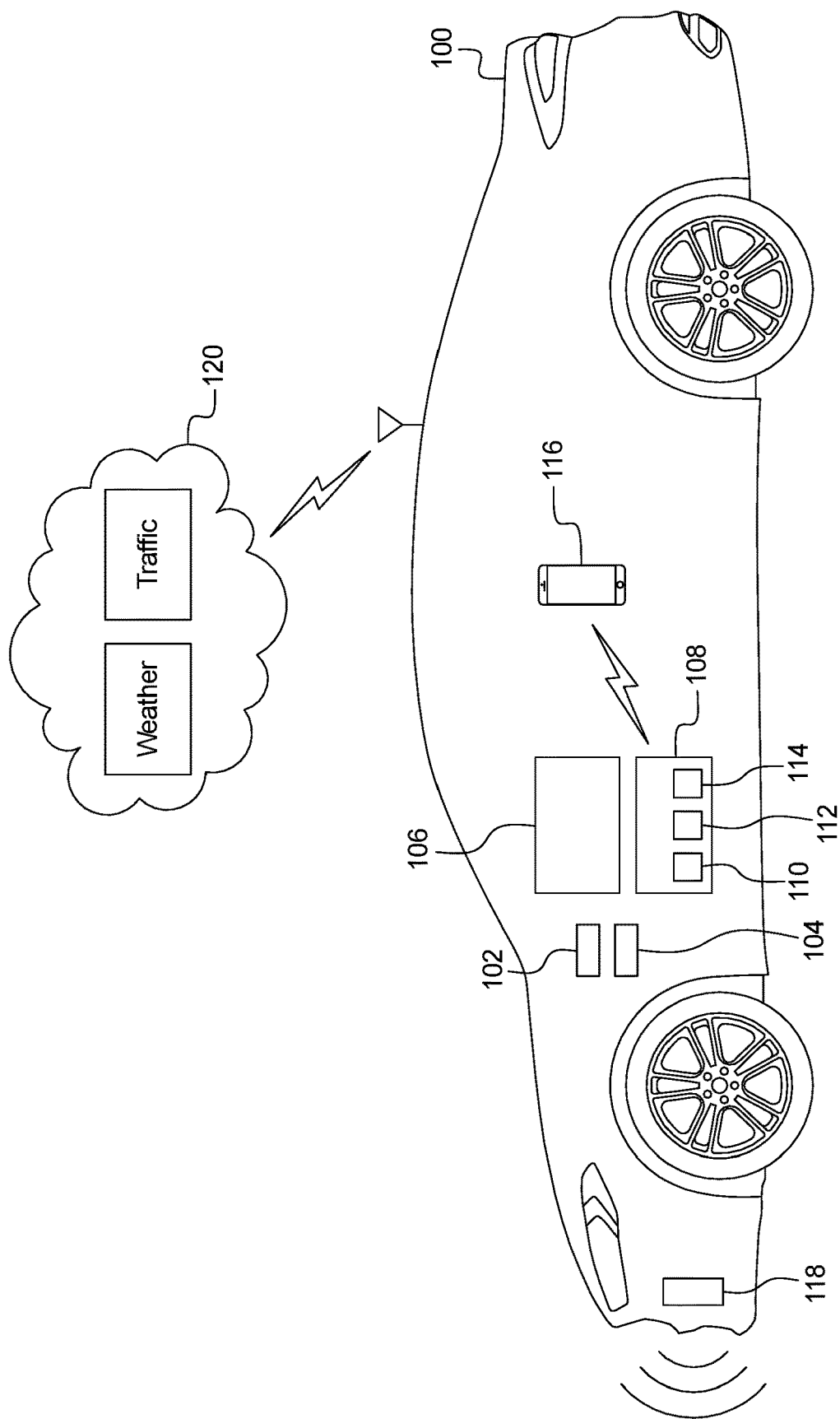
FIG. 1 illustrates an example vehicle with adaptive cruise control in accordance with the teachings of the disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Drivers interact with an adaptive cruise control system The adaptive cruise control receives commands from a driver including (a) activating the adaptive cruise control, (b) deactivating the adaptive cruise control, and (c) resuming the adaptive cruise control. Additionally, drivers adjust the settings of the adaptive cruise control, such as a desired speed and gap distance. Traditionally, the driver frequently manually adjusts these commands and/or settings based on factors related to the road, such as traffic density, speed limit, weather, and/or road condition, etc. As disclosed herein below, the adaptive cruise control of the present disclosure automatically adjusts the cruise control. The adaptive cruise control adjusts the cruise control commands and/or the settings based on (i) configurations of the settings in the past associated with a current geographic area of the vehicle, and/or (ii) rules defined by a user. In some examples disclosed herein below, if the configuration of the settings or the rules would cause the vehicle to increase in speed, the adaptive cruise control system requests the drivers to confirm the change before applying the configuration.

FIG. 1 illustrates an example vehicle 100 with adaptive cruise control 102 and a cruise control adjuster 104 that operate in accordance with the teachings of the disclosure. The vehicle 100 is any type of road vehicle (e.g., cars, trucks, vans, sport utility vehicles, etc.). The vehicle 100 may be a standard gasoline powered vehicle, a hybrid vehicle, an electric vehicle, a fuel cell vehicle, or any other type of suitable vehicle. The vehicle 100 includes parts related to mobility, such as a powertrain with an engine, a transmission, a suspension, a driveshaft, and/or wheels, etc. The vehicle 100 may also include standard features (not shown) such as a dashboard, adjustable seats, one or more batteries, an HVAC system including a compressor and electronic expansion valve, a windshield, doors, windows, seatbelts, airbags, and tires.

The vehicle 100 includes an infotainment head unit 106 and an on-board communications platform 108. The infotainment head unit 106 provides an interface between the vehicle 100 and a user (e.g., a driver, a passenger, etc.). The infotainment head unit 106 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a dashboard panel, a heads-up display, a center console display (e.g., a liquid crystal display ("LCD"), an organic light emitting diode ("OLED") display, a flat panel display, a solid state display, or a heads-up display), and/or speakers.

The on-board communications platform 108 includes wired or wireless network interfaces to enable communication with external networks. The on-board communications platform 108 also includes hardware (e.g., processors, memory, storage, antenna, etc.) and software to control the wired or wireless network interfaces. In the illustrated example, the on-board communications platform 108 includes a Bluetooth® controller 110, a GPS receiver 112, and a cellular modem 114. The cellular modem 114 includes controllers for one or more standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC), etc.). The on-board communications platform 108 may also include a wireless local area network module (including support for IEEE 802.11 a/b/g/n/ac or others; Wireless Gigabit (IEEE 802.11ad), etc.). Further, the external network(s) may be a public network, such as the Internet; a private network, such as an intranet; or combinations thereof, and may utilize a variety of networking protocols now available or later developed including, but not limited to, TCP/IP-based networking protocols. The on-board communications platform 108 may also include a wired or wireless interface to enable direct communication with an electronic device 116 (such as, a smart phone, a tablet computer, a laptop, etc.).

When activated, the adaptive cruise control 102 controls the speed of the vehicle 100 in accordance with cruise control settings specified by a driver. The cruise control settings include speed and gap distance. The gap distance is the space between the vehicle 100 and another vehicle in front of it. Often, gap distance is defined in term of seconds. For example, a 1-second gap distance is the distance the vehicle 100 will travel in one second at its current speed. In such an example, for a vehicle traveling at 70 miles per hour (mph), the 1-second gap distance is 103 feet. The adaptive cruise control 102 reacts to speed changes of the other vehicles in front of the vehicle 100. For example, the driver may set the cruise control to travel at 65 mph and have a 2-second gap distance. In such an example, when the vehicle 100 detects the other vehicle in front of it going slower, the adaptive cruise control 102 will slow the vehicle 100 to maintain the 2-second gap distance. The adaptive cruise control 102 increases the speed of the vehicle 100 up to the set speed when possible (e.g., can still maintain the gap distances at the higher speed). The vehicle 100 has range detection sensors 118 (such as ultrasonic sensors, RADAR, LiDAR, etc.) to detect the distance and speeds of other vehicles in front of the vehicle 100.

The vehicle 100 includes an adaptive cruise control interface that facilitates the driver controlling the adaptive cruise control 102. The adaptive cruise control interface may be (a) located on a control arm proximate the a steering wheel, (b) integrated into the steering wheel, and/or (c) integrated into a touch screen display of the infotainment head unit 106. The adaptive cruise control interface includes controls that facilitate the driver (i) activating the adaptive cruise control 102, (ii) deactivating the adaptive cruise control 102, (iii) resuming the adaptive cruise control 102, (iv) increasing the set speed, (v) decreasing the set speed, (vi) increasing the set gap distance, and (vii) decreasing the set gap distance. When the adaptive cruise control 102 is activated, the speed is initially set to the current speed of the vehicle 100 and the gap distance is initially set to a default setting (e.g., a 2-second gap distance, etc.). After the adaptive cruise control 102 is deactivated (e.g., by using the deactivation control, by applying a brake pedal, etc.), the resume command restores the speed and the gap distance settings of the adaptive cruise control 102 to the settings immediately before deactivation.

The cruise control adjuster 104 of the illustrated example records when a command is activated via the adaptive cruise control interface. As illustrated in FIG. 2, the vehicle includes an adaptive cruise control state database 200 to store the actions recorded by cruise control adjuster 104. The cruise control adjuster 104 creates event records 202 that include a current date field 204, a location field 206, an action field 208, setting field(s) 210, and an expiration date field 212.

The current date field 204 records the date on which the event record is created. The location field 206 records the location at which the command is input into the adaptive cruise control 102. In some examples, the location field 206 records coordinates (e.g., the latitude and longitude) retrieved from the GPS receiver 112. In such some examples, the location field 206 also records the heading (e.g., the direction of travel) retrieved from the GPS receiver 112. Alternately, in some examples, the location field 206 may record a zone identifier that identifies zone in which the command was used. A manufacturer of the cruise control adjuster 104 or any other suitable entity may define zones on roads in which actions within the zone are considered to be related. For example, a zone may encompass a one mile portion of a road. In some examples, a navigation system that uses the GPS receiver 112 may supply zone identifiers to supply to the adaptive cruise control 102.

The action field 208 records the action (e.g. activation, deactivation, resume, speed increase, speed decrease, gap distance increase, gap distance decrease, etc.). The setting field(s) 210 record(s) the settings of the adaptive cruise control 102 in relation to the action recorded in the action field 208. For example, when the adaptive cruise control 102 is activated, cruise control adjuster 104 may record a speed of 66 mph and a gap distance set of 2. The expiration date field 212 records a date at which the event records 202 no longer considered relevant and are discarded. For example, the date in the expiration date field 212 may be a year after the event is recorded. That is, in such an example, the cruise control adjuster 104 may no longer consider event records 202 from a year ago to be indicative of the driver's typical use of the adaptive cruise control 102.

Figure 3:
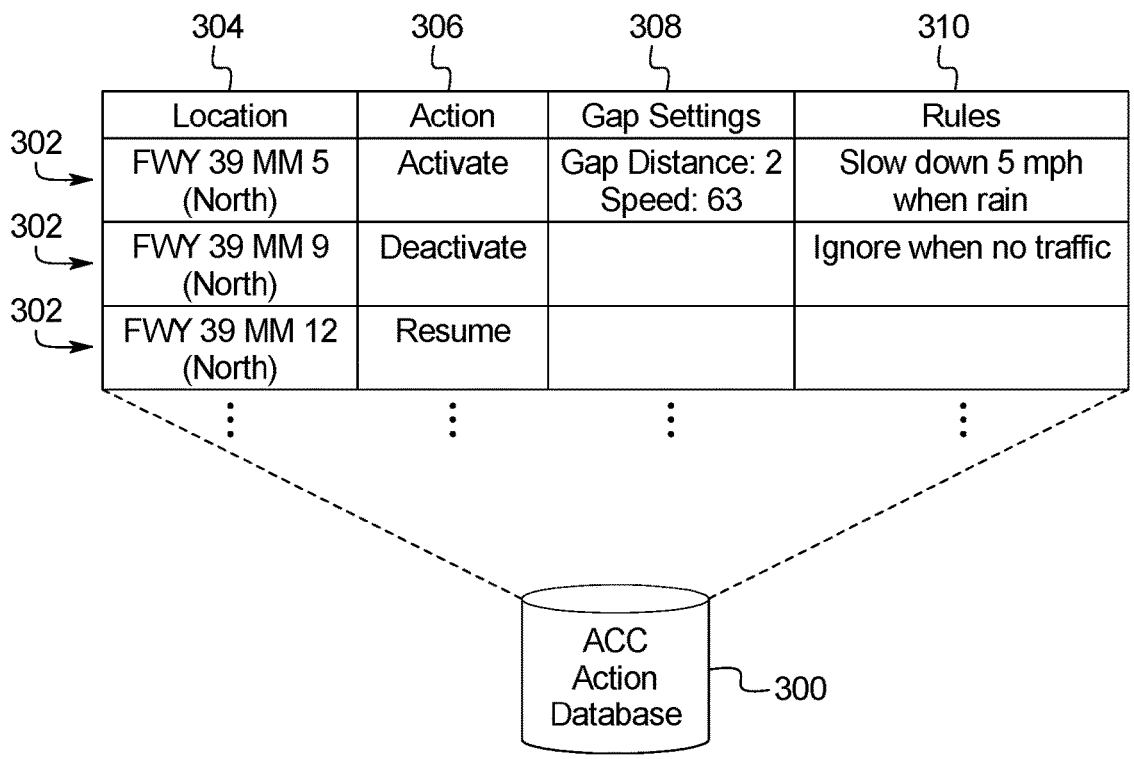
FIG. 3 illustrates an example data structure to store actions to be implemented by the adaptive cruise control of FIG. 1.

Returning to FIG. 1, the cruise control adjuster 104, from time to time (e.g., daily, weekly, monthly, etc.) analyzes the event records 202 stored in the adaptive cruise control state database 200. FIG. 3 illustrates an adaptive cruise control action database 300 that stores adaptive cruise control (ACC) actions 302 generated by the cruise control adjuster 104. The cruise control adjuster 104 generates the ACC actions 302 based on the event records 202 stored in the adaptive cruise control state database 200. In the illustrated examples, the ACC actions 302 include a location field 304, an action field 306, a settings field 308, and a rules field 310. The location field 304 specifies the location (e.g., the coordinates, the heading, the zone, etc.) at which the ACC action 302 is to be implemented by the adaptive cruise control 102. The action field 306 specifies which one of the actions the adaptive cruise control 102 is to implement. The settings field 308 specifies, if applicable, what speed and/or gap distance the adaptive cruise control 102 is to implement. The rules field 310 includes user-generated rules, if any, are associated with the ACC action 302. The user-generated rules provide circumstances in which to modify and/or ignore the corresponding ACC action 302. The user-generated rules provide a conditional statement (e.g. a statement of which circumstances in which to apply the user-generated rule) and an effect statement (e.g., how to modify the ACC action). For example, a user-generated rule may state "slow 5 mph when rain."

Returning to FIG. 1, the cruise control adjuster 104 instructs the adaptive cruise control 102 to adjust the current settings of the adaptive cruise control 102 based on past setting of the adaptive cruise control 102 as specified by the ACC action 302. To generate the ACC actions 302, the cruise control adjuster 104 compares the event records 202 that occurred at a same or similar location (as specified by the location field 206). The cruise control adjuster 104 generates the ACC action 302 when an action (e.g., the action specified by the action field 208 of FIG. 2) has a minimum level of support. In some examples, the minimum level of support is three event records 202. For example, a location defined as "Freeway 39 Mile Marker Five North" may be associated with three event records 202 associated with the "activate" action in the action field 208. In such an example, the cruise control adjuster 104 may generate an ACC action 302 associated with the "activate" action. The ACC action 302 includes one or more settings related to the settings (e.g., specified by the setting field(s) 210) of the corresponding event records 202. In some examples, the value(s) of the setting(s) are the average or mean values of the associated setting(s) of in the corresponding event records 202. For example, if a first "activate" event record 202 has the settings of "Speed: 66 mph; Gap Distance: 2," a second "activate" event record 202 has the settings of "Speed: 61 mph; Gap Distance: 2," and a third "activate" event record 202 has the settings of "Speed: 63 mph; Gap Distance: 3," the cruise control adjuster 104 may generate a new ACC action 302 associated with the "activate" command with the settings of "Speed: 63 mph; Gap Distance: 2."

As discussed below in connection with FIG. 5, the cruise control adjuster 104 provides an interface to facilitate a user viewing and/or editing the ACC actions 302. For example, an ACC action 302 may indicate that the adaptive cruise control 102 is to be activated at a certain location with a speed setting of 63 mph. For such an example, the interface may facilitate the user editing the speed setting of one of the ACC actions 302 from 63 mph to 65 mph. The interface also facilitates the user inputting user-generated rules that, when satisfied, will change the settings of the adaptive cruise control 102. The cruise control adjuster 104 may provide rule templates and/or define syntax to use when generating and interpreting the rules. For example, the user may define a rule so that the speed setting of the adaptive cruise control equals an offset of the speed limit. As another example, a user may define a rule that specifies a geographical area where the speed setting of the adaptive cruise control is to have a specific value.

In some examples, the interface facilitates the user-generated used to be associated with the ACC actions 302 (e.g., specified by the rules field 310). For example, a user-generated rule may state that the speed setting of the ACC action 302 is to be reduced by 5 mph when it is raining. In some examples, the cruise control adjuster 104 provides the interface via a display of the infotainment head unit 106. Additionally or alternatively, in some examples, the cruise control adjuster 104 provides the interface via an application executing on the electronic device 116 connected to the vehicle 100 via the on-board communications platform 108. In some examples, when the vehicle 100 is connected to an external network (via the on-board communications platform 108), the cruise control adjuster 104 uploads and/or downloads ACC actions 302 between the vehicle 100 and a cloud provider (e.g., Amazon Web Services, Microsoft Azure, etc.) and provides the interface via an application hosted by the cloud provider.

Figure 4:
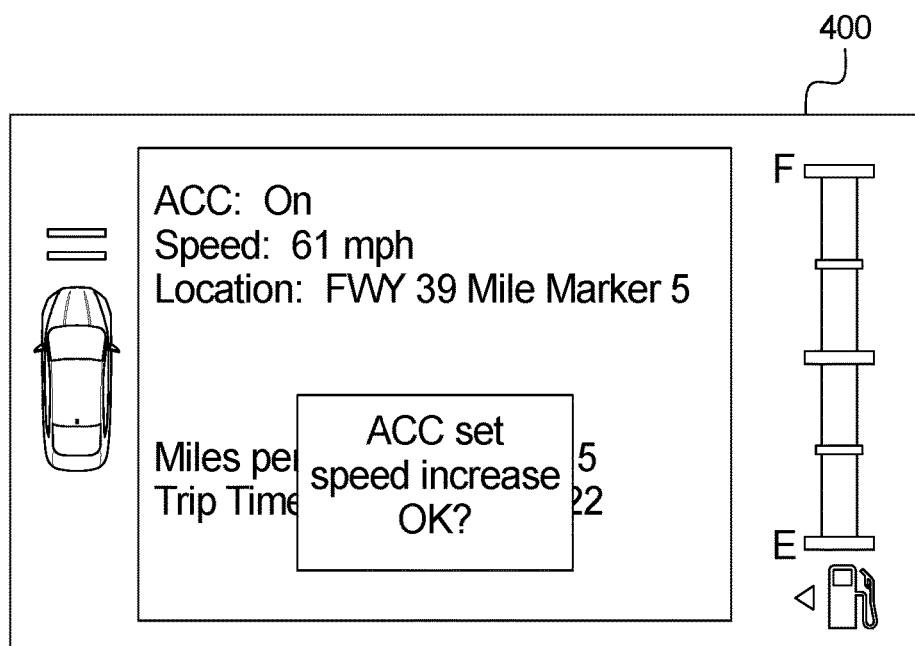
FIG. 4 illustrates an example interface to inform a driver of autonomous actions of the adaptive cruise control of FIG. 1.

The cruise control adjuster 104 monitors the location of the vehicle 100 (via the GPS receiver 112). The cruise control adjuster 104 compares the current location of the vehicle 100 to locations specified by the user-generated rules and/or the ACC actions 302 stored in the adaptive cruise control action database 300. If the current location matches the location associated with one of the user-generated rules, the cruise control adjuster 104 instructs the adaptive cruise control 102 to adjust the speed and/or gap distance settings as specified by the user-generated rule. If the current location matches the location associated with one of the ACC actions 302, the cruise control adjuster 104 instructs the adaptive cruise control 102 to adjust the speed and/or gap distance settings as specified by the ACC action 302. If the current location matches the location associated with one of the ACC actions 302 and one or more of the user-generated rules, the cruise control adjuster 104 modifies the ACC action 302 with the user-generated rule(s), and instructs the adaptive cruise control 102 to adjust the speed and/or gap distance settings. If implementing the ACC action 302 and/or the user-generated rule(s) would result in the speed of the vehicle 100 increasing, the cruise control adjuster 104 prompts the driver, via the infotainment head unit 106, to confirm the change before instructing the adaptive cruise control 102 to change its settings. In some examples, if implementing the ACC action 302 and/or the user-generated rule(s) would result in decreasing the gap distance of the vehicle 100, activating the adaptive cruise control 102, deactivating the adaptive cruise control 102, or resuming the adaptive cruise control 102, the cruise control adjuster 104 prompts the driver, via the infotainment head unit 106, to confirm the change before instructing the adaptive cruise control 102 to change its settings. FIG. 4 illustrated an example interface 400 to prompt the driver to confirm the ACC action 302. The driver may confirm the ACC action 302 via an input device, such as a touch screen and/or a button on the steering wheel, etc.

In the illustrated example, the vehicle 100 is connected to an external network 120 (e.g., the Internet) via the on-board communications platform 108. The vehicle 100 receives external information, such as the current weather, road conditions, and/or traffic density near the vehicle 100, via the external network 120. The cruise control adjuster 104 uses the information to determine whether to apply the user-generated rules.

Figure 5:
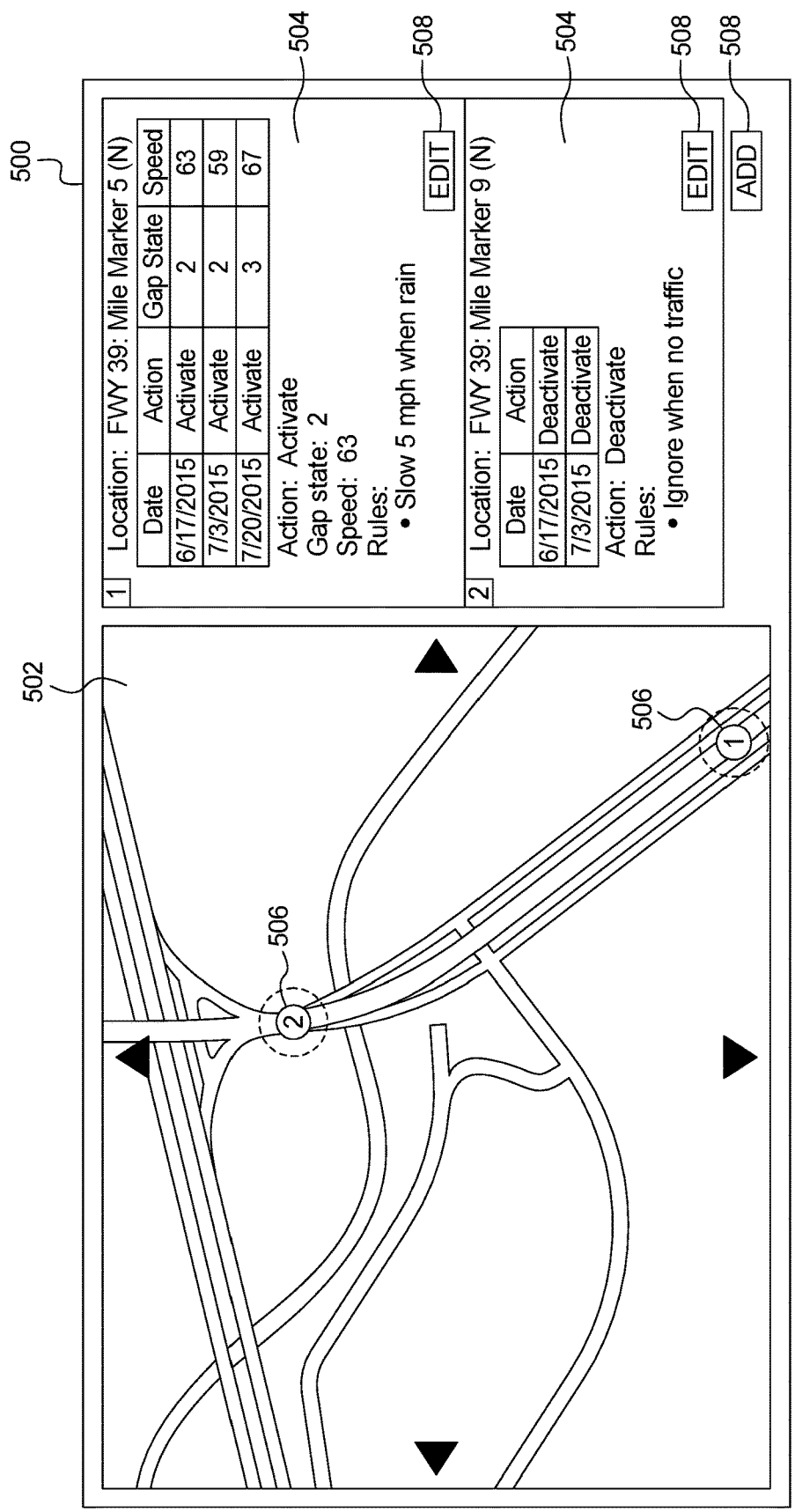
FIG. 5 illustrates an example interface to facilitate a user entering parameters into the adaptive cruise control of FIG. 1.

FIG. 5 illustrates an example interface 500 to facilitate a user editing ACC actions 302 stored in the adaptive cruise control action database 300 of FIG. 3. In the illustrated example, the interface 500 includes a map 502 and one or more ACC action viewers 504. The example map 502 facilitates visual representations 506 of the locations associated with the ACC actions 302 displayed by the ACC action viewers 504. In the illustrated example, the ACC action viewers 504 display the value of the location field 304, the corresponding event records 202, the value of the action field 306, the value(s) of the settings field 308, and the user-generated rules 310 associated with the particular ACC action. The interface 500 provides commands 508 to facilitate the user changing the ACC actions 302. For example, the user may edit an existing ACC action 302 and/or may add a new ACC action 302. The cruise control adjuster 104 may present the interface 500 to the user via the infotainment head unit 106, an application executing on the electronic device 116 connected to the vehicle 100 (e.g. via the Bluetooth® controller 110), and/or an application executing on the external network 120.

Figure 6:
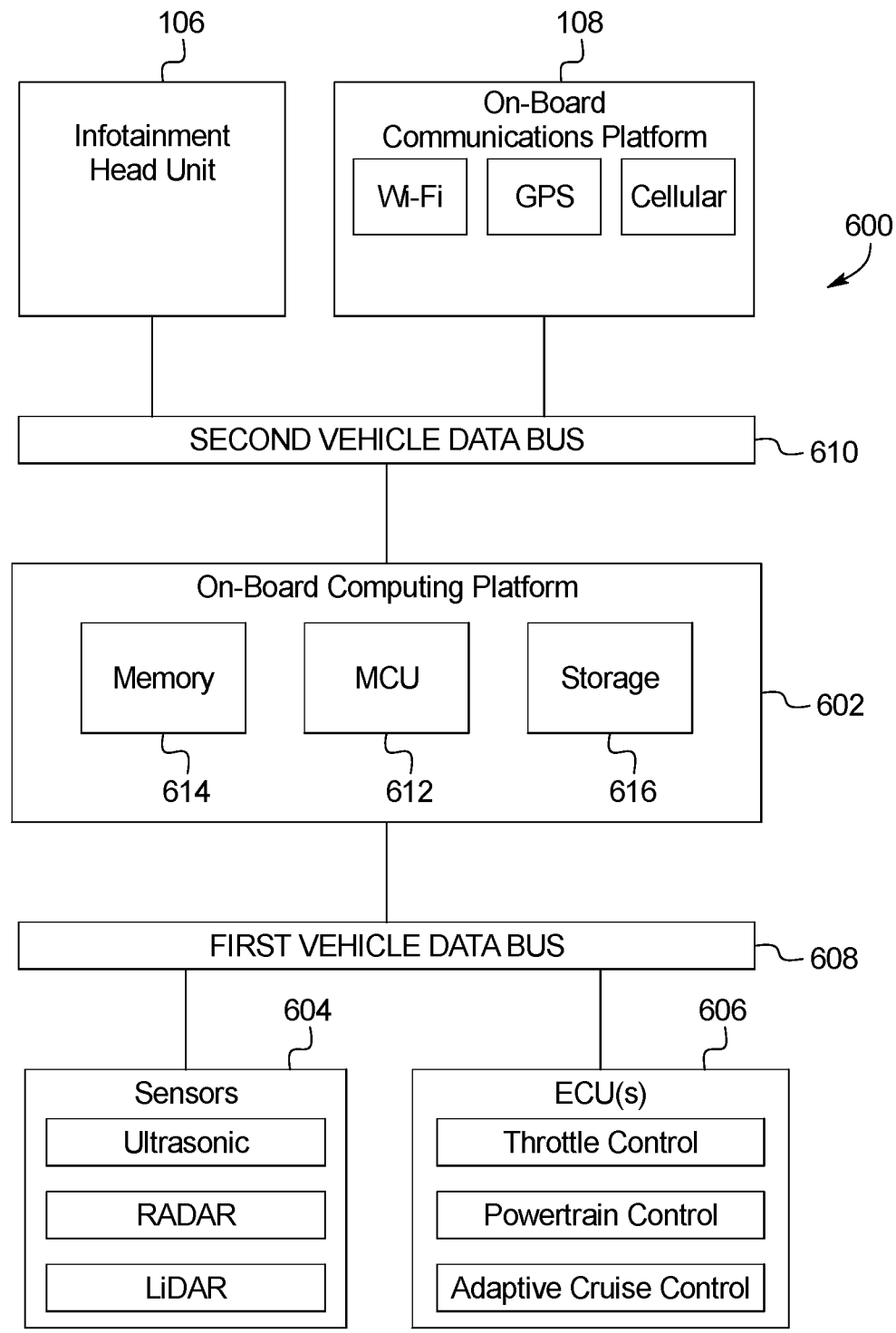
FIG. 6 illustrates example electronic components of the vehicle of FIG. 1.

FIG. 6 illustrates example electronic components 600 of the vehicle 100 of FIG. 1. The electronic components 600 include the on-board communications platform 108, the infotainment head unit 106, an on-board computing platform 602, example sensors 604, example ECUs 606, a first vehicle data bus 608, and a second vehicle data bus 610.

The on-board computing platform 602 includes a processor or controller 612, memory 614, and storage 616. In some examples, the on-board computing platform is structured to include the cruise control adjuster 104. Alternatively, the cruise control adjuster 104 is integrated into the adaptive cruise control 102. The processor or controller 612 may be any suitable processing device or set of processing devices such as, but not limited to: a microprocessor, a microcontroller-based platform, a suitable integrated circuit, one or more field programmable gate arrays (FPGAs) or one or more application-specific integrated circuits (ASICs). The memory 614 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), and read-only memory. In some examples, the memory 614 includes multiple kinds of memory, particularly volatile memory and non-volatile memory. The storage 616 may include any high-capacity storage device, such as a hard drive, and/or a solid state drive. In some examples, the adaptive cruise control state database 200 and/or the adaptive cruise control action database 300 are stored in the memory 614 and/or the storage 616.

The memory 614 and the storage 616 are a computer readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 614 the computer readable medium, and/or within the processor 612 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 604 may be arranged in and around the vehicle 100 in any suitable fashion. In the illustrated example, the sensors 604 include the range detection sensors 118 (e.g., the ultrasonic sensors, the RADAR sensors, the LiDAR sensor, etc.). The ECUs 606 monitor and control the systems of the vehicle 100. The ECUs 606 communicate and exchange information via the first vehicle data bus 608. Additionally, the ECU(s) 506 may communicate properties (such as, status of the ECU 606, sensor readings, control state, error and diagnostic codes, etc.) to and/or receive commands from the on-board computing platform 602. Some vehicles 100 may have seventy or more ECUs 606 located in various locations around the vehicle 100 communicatively coupled by the first vehicle data bus 608. The ECUs 606 (such adaptive cruise control 102, etc.) are discrete sets of electronics that include their own circuit(s) (such as integrated circuits, microprocessors, memory, storage, etc.) and firmware, sensors, actuators, and/or mounting hardware.

The second vehicle data bus 610 communicatively couples the on-board communications platform 108, the infotainment head unit 106, and the on-board computing platform 602. The second vehicle data bus 610 may be a Media Oriented Systems Transport (MOST) bus, an Ethernet bus, or a controller area network flexible data (CAN-FD) bus (International Standards Organization (ISO) 11898-7), etc. The first vehicle data bus 608 communicatively couples the sensors 604, the ECUs 606, the on-board computing platform 602, and other devices connected to the first vehicle data bus 608. In the illustrated examples, the first vehicle data bus 608 is implemented in accordance with the controller area network (CAN) bus protocol as defined by International Standards Organization (ISO) 11898-1. Alternatively, in some examples, the first vehicle data bus 608 may be implemented as a MOST bus, an Ethernet bus, or a CAN-FD bus, etc. In some examples, the on-board computing platform 602 communicatively isolates the second vehicle data bus 610 and the first vehicle data bus 608 (e.g., via firewalls, message brokers, etc.). Alternatively, in some examples, the second vehicle data bus 610 and the first vehicle data bus 608 are the same data bus.

Figure 7:
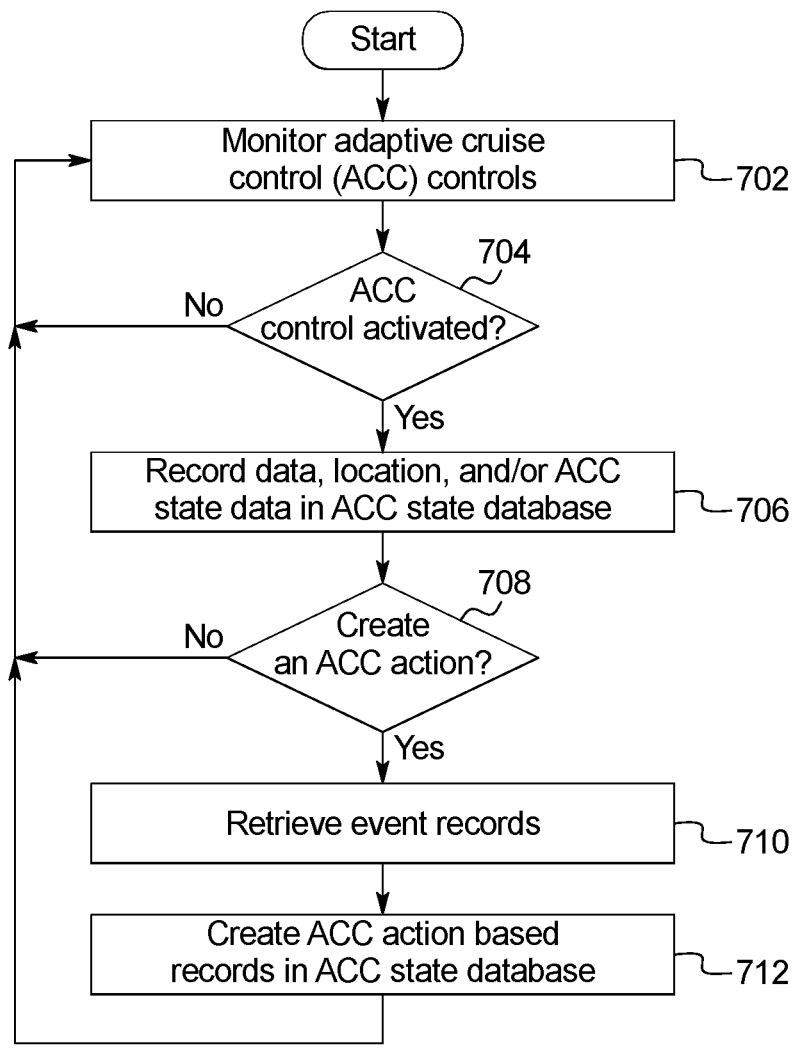
FIG. 7 is a flowchart of an example method to record user interactions with and generate autonomous actions for the adaptive cruise control of FIG. 1.

FIG. 7 is a flowchart of an example method of operating the cruise control adjuster 104 to record events (e.g., the event records 202 of FIG. 2) and to generate ACC actions 302. Initially, the cruise control adjuster 104 monitors the controls of the adaptive cruise control 102 (block 702). The cruise control adjuster 104 determines when one of the controls (e.g., activate, deactivate, resume, increase gap distance, decrease gap distance, increase speed, decrease speed, etc.) is activated (block 704). When one of the controls is activated, the cruise control adjuster 104 generates an event record 202 based on the date, the location of the vehicle 100, the activated control, and the settings data (block 706). For example, the cruise control adjuster 104 may generate a event record 202 with "2/15/2016" in the current date field 204, "FWY 39 MM 5 North" in the location field 206, "activate" in the action field 208, "45 mph" and "2" in the setting fields 210, and "8/15/2017" in the expiration date field 212.

The cruise control adjuster 104 determines whether to create an ACC action 302 (block 708). The cruise control adjuster 104 generates the ACC action 302 if there is a minimum level of support for the command specified in the action field 208 at the location and, in some examples, the heading specified by the location field 206 in the adaptive cruise control state database 200. In some examples, the minimum level of support is three event records 202. In some examples, the cruise control adjuster 104 uses event records 202 associated with locations near (e.g., half a mile, a mile, two miles, etc.) the event record 202 generated at block 706 with the same heading when determining the whether there is the minimum level of support. If there is a minimum level of support, the cruise control adjuster 104 retrieves the event records 202 identified at block 708 (block 710). The cruise control adjuster 104 generates a new ACC action 302 based on the event records 202 retrieved at block 710 (block 712). The cruise control adjuster 104 then continues to monitor the adaptive cruise control 102 (block 702).

Figure 8:
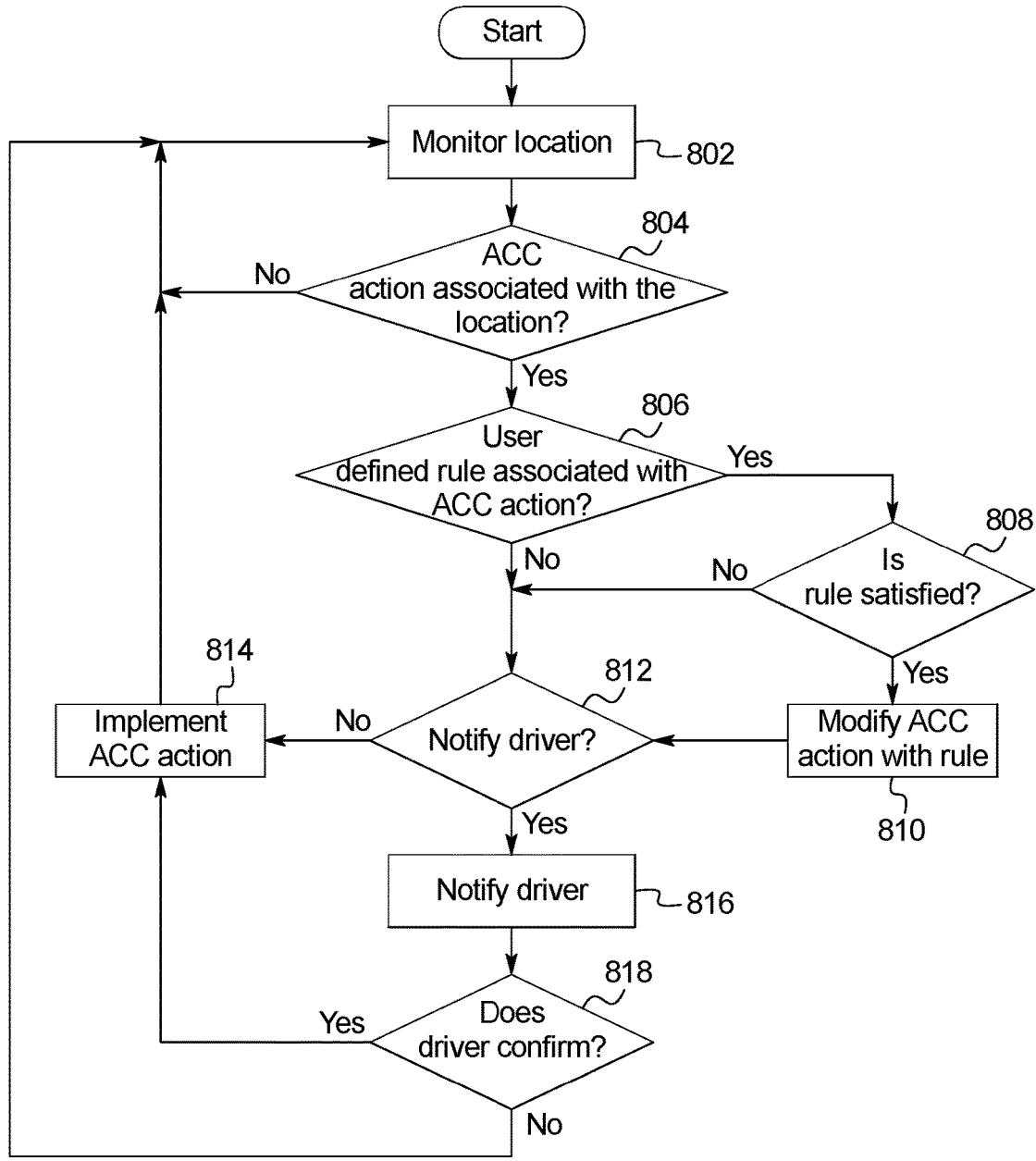
FIG. 8 is a flowchart of an example method to operate the adaptive cruise control of FIG. 1 based on user defined parameters.

FIG. 8 is a flowchart of an example method of operating the cruise control adjuster 104 to control the adaptive cruise control 102 based on the ACC actions 302 in the adaptive cruise control action database 300. Initially, the cruise control adjuster 104 monitors the location of the vehicle 100 (block 802). In some examples, to monitor the location and the heading of the vehicle 100, the cruise control adjuster 104 is communicatively coupled to the GPS receiver 112 and/or a navigation system. The cruise control adjuster 104 determines whether the location and the heading of the vehicle 100 is associated with one of the ACC actions 302 in the adaptive cruise control action database 300 (block 804).

If the location and the heading of the vehicle 100 is associated with one of the ACC actions 302, the cruise control adjuster 104 determines whether a user-generated rule is associated with the ACC action 302 (block 806). For example, the ACC action 302 may have user-defined rule(s) specified in the rules field 310. If the user-generated rule(s) is/are associated with the ACC action 302, the cruise control adjuster 104 determines whether the user-generated rule(s) is/are satisfied (block 808). For example, if the user generated rule states "slow 5 mph when rain," the cruise control adjuster 104 determines if the weather information indicates that it is raining. If one or more of the user-generated rules is/are satisfied, the cruise control adjuster 104 applies the satisfied user-generated rule(s) to the ACC action 302 (block 810). For example, if the ACC action 302 specifies activating the adaptive cruise control 102 with a speed of 52 mph and a gap distance of 2, applying the "slow 5 mph when rain" rule, the cruise control adjuster 104 would modify the ACC action 302 to activate the adaptive cruise control 102 with a speed of 47 mph and a gap distance of 2.

The cruise control adjuster 104 determines whether to notify the driver (block 812). The cruise control adjuster 104 determines to notify the driver if the ACC action 302 increases the speed of the vehicle 100. In some examples, the cruise control adjuster 104 determines to notify the driver if the ACC action 302 decreases the gap distance of the vehicle 100, activates the adaptive cruise control 102, and/or resumes the adaptive cruise control 102. For example, if the ACC action 302 is to decrease the speed of the vehicle 100, the cruise control adjuster 104 may determine not to notify the driver. If the cruise control adjuster 104 determines not to notify the driver, the cruise control adjuster 104 instructs the adaptive cruise control 102 to implement the ACC action 302 (block 814). For example, if the ACC action 302 is to increase the gap distance setting to 3, the cruise control adjuster 104 instructs the adaptive cruise control 102 increase its gap distance setting to 3.

If the cruise control adjuster 104 determines to notify the driver, the cruise control adjuster 104 presents an audio and/or visual confirmation message to the driver (block 816). In some examples, the cruise control adjuster 104 displays the confirmation message on a display of the infotainment head unit 106 as illustrated in FIG. 4. The cruise control adjuster 104 determines whether the driver confirms the ACC action 302 (block 818). In some examples, the cruise control adjuster 104 determines whether the driver confirms the ACC action 302 based on receiving an input (e.g., a button press, a touch screen press, a voice command, etc.) from the driver via the infotainment head unit 106 and/or the steering column. If the cruise control adjuster 104 determines that the driver confirms the ACC action 302, the cruise control adjuster 104 instructs the adaptive cruise control 102 to implement the ACC action 302 (block 814). Otherwise, if the cruise control adjuster 104 determines that the driver does not confirm the ACC action 302, the cruise control adjuster 104 continues to monitor the location and the heading of the vehicle 100 (block 802). If some examples, the cruise control adjuster 104 determines that the driver does not confirm the ACC action 302 after a period of time (e.g., 15 second, 30 seconds, etc.) and/or after traveling a certain distance (e.g., 1 mile, 2 miles, etc.).

The flowcharts of FIGS. 7 and 8 are representative of machine readable instructions that comprise one or more programs that, when executed by a processor (such as the processor 612 of FIG. 6), cause the vehicle 100 to implement the cruise control adjuster 104 of FIG. 1. Further, although the example programs are described with reference to the flowchart illustrated in FIGS. 7 and 8, many other methods of implementing the example cruise control adjuster 104 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes,"

"including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

The invention claimed is:

1. A vehicle comprising:
   a GPS receiver configured to provide a location of the vehicle;
   a cruise control adjuster configured to, via a processor:
      store, in memory, manual changes to settings of an adaptive cruise control by a driver within a threshold distance of the location, each of the manual changes associated with a different date;
      delete the manual changes from the memory as the manual changes become older than a threshold expiration date;
      generate a cruise control event associated with the location in response to detecting a threshold number of manual changes associated with the location within memory;
      receive input, via a touch screen of the vehicle, modifying the cruise control event with driver preferences; and
      subsequently, at the location, change the settings of the adaptive cruise control based on the cruise control event as modified by the driver preferences.

2. The vehicle of claim 1, wherein the manual changes to settings of the adaptive cruise control include at least one of activating the adaptive cruise control, deactivating the adaptive cruise control, resuming the adaptive cruise control, modifying a speed setting of the adaptive cruise control, or modifying a gap distance setting of the adaptive cruise control.

3. The vehicle of claim 1, wherein the cruise control adjuster is configured to, when changing the settings of the adaptive cruise control to one of activating the adaptive cruise control, resuming the adaptive cruise control, increasing a speed setting of the adaptive cruise control, or decreasing a gap distance setting of the adaptive cruise control, prompt the driver to confirm an action before changing the settings.

4. The vehicle of claim 3, wherein the cruise control adjuster is configured to, in response to receiving an affirmative input from the driver, change the settings of the adaptive cruise control.

5. The vehicle of claim 3, wherein the cruise control adjuster is configured to, in response to receiving a negative input from the driver, not change the settings of the adaptive cruise control.

6. The vehicle of claim 1, wherein the cruise control adjuster is configured to provide, via a touch screen of the vehicle, a list of the cruise control events and associated locations.

7. The vehicle of claim 1, wherein when the manual changes to the settings of the adaptive cruise control include changes in a speed setting of the adaptive cruise control, the cruise control adjuster is configured to generate the cruise control event based on an average of the changes in the speed setting.

8. A method comprising:
   receiving, from a GPS receiver, a location of a vehicle;
   storing, in memory, manual changes to settings of an adaptive cruise control by a driver within a threshold distance of the location, each of the manual changes associated with a different date;
   deleting the manual changes from the memory as the manual changes become older than a threshold expiration date;
   generating, with a processor, a cruise control event associated with the location in response to detecting a threshold number of manual changes associated with the location within memory;
   receiving input, via a touch screen of the vehicle, modifying the cruise control event with driver preferences; and
   subsequently, at the location, changing the settings of the adaptive cruise control based on the cruise control event as modified by the driver preferences.

9. The method of claim 8, wherein the manual changes to settings of an adaptive cruise control include at least one of activating the adaptive cruise control, deactivating the adaptive cruise control, resuming the adaptive cruise control, modifying a speed setting of the adaptive cruise control, or modifying a gap distance setting of the adaptive cruise control.

10. The method of claim 8, including when changing the settings of the adaptive cruise control to one of activating the adaptive cruise control, resuming the adaptive cruise control, increasing a speed setting of the adaptive cruise control, or decreasing a gap distance setting of the adaptive cruise control, prompting the driver to confirm an action before changing the settings.

11. The method of claim 10, including in response to receiving an affirmative input from the driver, changing the settings of the adaptive cruise control.

12. The method of claim 10, including in response to receiving a negative input from the driver, not changing the settings of the adaptive cruise control.

13. The method of claim 8, including providing, via a touch screen of the vehicle, a list of the cruise control events and associated locations.

14. The method of claim 8, including, when the manual changes to the settings of the adaptive cruise control include changes in a speed setting of the adaptive cruise control, generating the cruise control event based on an average of the changes in the speed setting.

15. A vehicle comprising:
   a GPS receiver configured to provide a location of the vehicle;
   a cruise control adjuster configured to, via a processor:
      generate a cruise control event associated with the location in response to detecting a threshold number of manual changes to settings of an adaptive cruise control by a driver within a threshold distance of the location, each of the manual changes associated with a different date;
      provide, via a touch screen of the vehicle, a list of the cruise control events and associated locations;
      receive a selection, via the touch screen of the vehicle, of one of the cruise control events;
      receive an input, via the touch screen of the vehicle, of a user-generated conditional rule associated with the selected one of the cruise control events, the conditional rule defining (a) a condition and (b) a modification to the selected one of the cruise control events; and subsequently, at the location, change the settings of the adaptive cruise control based on the cruise control event as modified by the conditional rule when the condition is true.

* * * * *